US008583832B2

(12) United States Patent
Krzanowski et al.

(10) Patent No.: US 8,583,832 B2
(45) Date of Patent: Nov. 12, 2013

(54) NETWORK INTERFACE DEVICE MANAGEMENT USING MANAGEMENT TRANSPORT CHANNEL

(75) Inventors: Roman R. Krzanowski, White Plains, NY (US); Hicham Zhiri, Northridge, CA (US)

(73) Assignees: Verizon Patent and Licensing Inc., Basking Ridge, NJ (US); Canoga Perkins Corporation, Chatsworth, CA (US)

( * ) Notice: Subject to any disclaimer, the term of this patent is extended or adjusted under 35 U.S.C. 154(b) by 838 days.

(21) Appl. No.: 12/347,678

(22) Filed: Dec. 31, 2008

(65) Prior Publication Data

US 2010/0169506 A1 Jul. 1, 2010

(51) Int. Cl.
*G06F 15/16* (2006.01)
*G06F 15/173* (2006.01)

(52) U.S. Cl.
USPC ............................ 709/250; 709/223; 709/238

(58) Field of Classification Search
USPC .................................. 709/223, 238; 370/351
See application file for complete search history.

(56) References Cited

U.S. PATENT DOCUMENTS

| 7,380,011 | B2* | 5/2008 | Li et al. ........................ 709/227 |
| 7,382,756 | B2* | 6/2008 | Barber et al. .................. 370/338 |
| 7,633,956 | B1* | 12/2009 | Parandekar et al. .......... 370/401 |
| 7,710,900 | B2* | 5/2010 | Andrews et al. .............. 370/254 |
| 7,860,099 | B2* | 12/2010 | Chuang et al. ................ 370/392 |
| 7,869,450 | B2* | 1/2011 | DelRegno et al. ............ 370/409 |
| 8,112,801 | B2* | 2/2012 | Abdel-Aziz et al. ............ 726/22 |
| 8,190,724 | B2* | 5/2012 | Norton .......................... 709/223 |
| 8,244,846 | B2* | 8/2012 | Wong et al. ................... 709/223 |
| 2004/0103318 | A1* | 5/2004 | Miller et al. .................. 713/201 |
| 2005/0097219 | A1* | 5/2005 | Goguen et al. ................ 709/238 |
| 2005/0220014 | A1* | 10/2005 | DelRegno et al. ............ 370/230 |
| 2005/0220022 | A1* | 10/2005 | DelRegno et al. ............ 370/235 |
| 2006/0215548 | A1* | 9/2006 | Le Faucheur et al. ........ 370/228 |
| 2007/0110017 | A1* | 5/2007 | Fulknier et al. ............... 370/338 |
| 2008/0056156 | A1* | 3/2008 | Andrews et al. .............. 370/254 |
| 2008/0091834 | A1* | 4/2008 | Norton .......................... 709/229 |
| 2008/0281980 | A1* | 11/2008 | Del Regno et al. ........... 709/238 |
| 2008/0285592 | A1* | 11/2008 | Emmendorfer et al. ...... 370/474 |
| 2009/0010182 | A1* | 1/2009 | Tochio .......................... 370/254 |
| 2009/0010257 | A1* | 1/2009 | Chaudhry et al. ............ 370/390 |
| 2009/0024729 | A1* | 1/2009 | Nelissen ....................... 709/223 |
| 2009/0044276 | A1* | 2/2009 | Abdel-Aziz et al. ............ 726/24 |
| 2009/0141702 | A1* | 6/2009 | Kuo et al. ..................... 370/351 |
| 2012/0203852 | A1* | 8/2012 | Norton .......................... 709/206 |
| 2013/0031201 | A1* | 1/2013 | Kagan et al. .................. 709/213 |

* cited by examiner

*Primary Examiner* — Joon H. Hwang
*Assistant Examiner* — Sargon Nano (57) ABSTRACT

A master network interface device (M-NID) receives, from a network management system (NMS) via a first peer-to-peer (P2P) transport channel, first data destined for a first client network interface device (C-NID), where the first data is associated with network management functions. The M-NID further receives, from the NMS via the first P2P transport channel, second data destined for a second C-NID, where the second data is associated with network management functions. The M-NID forwards the first data from the M-NID to the destination first C-NID via a second P2P transport channel that is different than the first P2P transport channel. The M-NID also forwards the second data from the M-NID to the destination second C-NID via a third P2P transport channel that is different than the first P2P transport channel.

20 Claims, 7 Drawing Sheets

NETWORK INTERFACE DEVICE MANAGEMENT USING MANAGEMENT TRANSPORT CHANNEL

BACKGROUND

Network interface devices (NIDs) include devices used for interfacing customer premises equipment (CPE) to a network, such as an Ethernet network. Multiple NIDs in a given network may be configured in a "master" and "client" service topology, where a selected NID acts as a "master" NID which sends data traffic to the "client" NIDs that it serves, and vice versa.

A network management system (NMS) may perform network management activities related to the operation, administration, maintenance and provisioning of a network that includes the Ethernet. The network management functions performed by the NMS may include, for example, controlling, planning, allocating, deploying, coordinating and monitoring the resources of a network. The network management functions may further include network planning, predetermined traffic routing to support load balancing, cryptographic key distribution authorization, configuration management, fault management, security management, performance management, bandwidth management and/or accounting management. To perform one or more of these network management functions, the NMS may send NID management traffic to the NIDs of the network.

In the Ethernet network, NIDs are managed using a dedicated VLAN overlayed over the Ethernet network. Each NID can access this VLAN and send and receive the management traffic over it to and from the NMS. In this typical NID management arrangement, the management traffic to and from the NMS is flowing directly between each NID and the NMS. This arrangement, however, requires a direct management channel to each NID from the NMS. In networks (e.g., multi-protocol label switching (MPLS) networks with pseudowires (PWs)) where the NIDs terminating Ethernet transport are connected over peer-to-peer (P2P) circuits, such as emulated PWs, the fact that each NID must be accessed directly from the NMS requires that a separate channel be open between the NMS and each NID. To satisfy this requirement, a management overlay must be created over such a network, adding additional complexity to the network and extra cost to deployment of the network.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Systems and methods described herein reduce the number of direct interfaces between the NMS and NIDs by having the management traffic between all NIDs and the NMS sent indirectly over a management transport channel between the master NID and the NMS, where the management transport channel includes any type of P2P emulated circuit. Such an arrangement reduces the need to provide the separate NID management overlay, requires only one direct interface between the NMS and NIDs rather than an interface between each NID and the NMS, and reduces the complexity of the network design. In exemplary implementations described herein, the master NID directs management traffic received via a management transport channel from the NMS to specific client NIDs, and directs management traffic from respective NIDs to the NMS over the management transport channel. Exemplary implementations described herein, thus, simplify network management of NID devices in networks that use P2P emulated circuits for traffic transport through the use of a P2P management transport channel between the master NID and the NMS.

Figure 1:
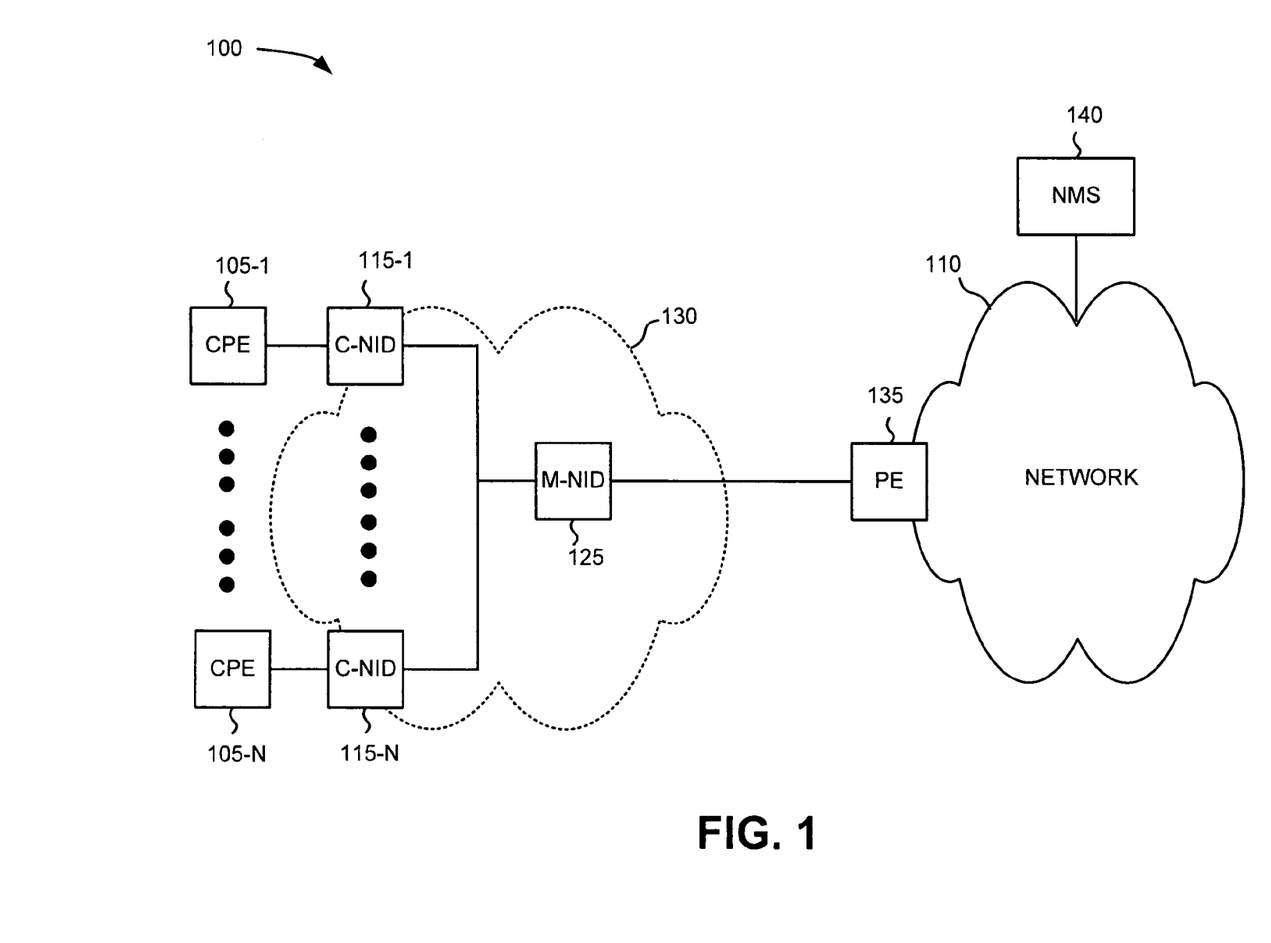
FIG. 1 is a diagram of an exemplary network in which systems and methods described herein may be implemented.

FIG. 1 is a diagram of an exemplary network 100 in which systems and methods described herein may be implemented. As shown, network 100 may include multiple customer premises equipment (CPE) 105-1 through 105-N coupled directly or indirectly to a network 110 via respective network interface devices (NIDs) 115-1 through 115-N and 125. A provider edge (PE) node 135 may reside on the edge of network 110 and may forward data traffic from data sources (not shown) coupled to network 110 to NIDs 115-1 through 115-N and 125 and may further forward management traffic from Network Management System (NMS) 140 to NIDs 115-1 through 115-N and 125. PE node 135 may include, for example, a router, switch or gateway.

As shown in FIG. 1, NIDs 115-1 through 115-N and 125 may be configured in a "master-client" service topology in which a single "master" NID (e.g., master-NID (M-NID) 125) serves as a relay point for receiving data from, and sending data to, each of the client NIDs (C-NIDs) 115-1 through 115-N. C-NIDs 115-1 through 115-N and M-NID 125 may interconnect with each other via a network 130.

M-NID 125 may receive data traffic from data sources (not shown) coupled to network 110 and may forward that data to respective destination C-NIDs of C-NIDs 115-1 through 115-N via a data transport channel(s). M-NID 125 may further receive management traffic from NMS 140 via a management transport channel and may forward that management traffic to respective ones of C-NIDs of C-NIDs 115-1 through 115-N via one or more other management transport channels. M-NID 125 may further receive data traffic from each of C-NIDs 115-1 through 115-N via one or more data transport channels and may forward that data traffic towards its destination in network 110. M-NID 125 may also receive management traffic from each of C-NIDs 115-1 through 115-N and may forward the management traffic to NMS 140 via a management transport channel.

Network(s) 110 may include one or more networks of any type, including, for example, a local area network (LAN); a wide area network (WAN); a metropolitan area network (MAN); a telephone network, such as the Public Switched Telephone Network (PSTN) or a Public Land Mobile Network (PLMN); a satellite network; an intranet, the Internet; or a combination of networks. The PLMN(s) may further include a packet-switched network, such as, for example, a General Packet Radio Service (GPRS) network, a Cellular Digital Packet Data (CDPD) network, or Mobile IP network.

Network 130 may include any type of network that employs peer-to-peer (P2P) connections for the transport of traffic. In one exemplary implementation, network 130 may include an Ethernet.

Figure 2:
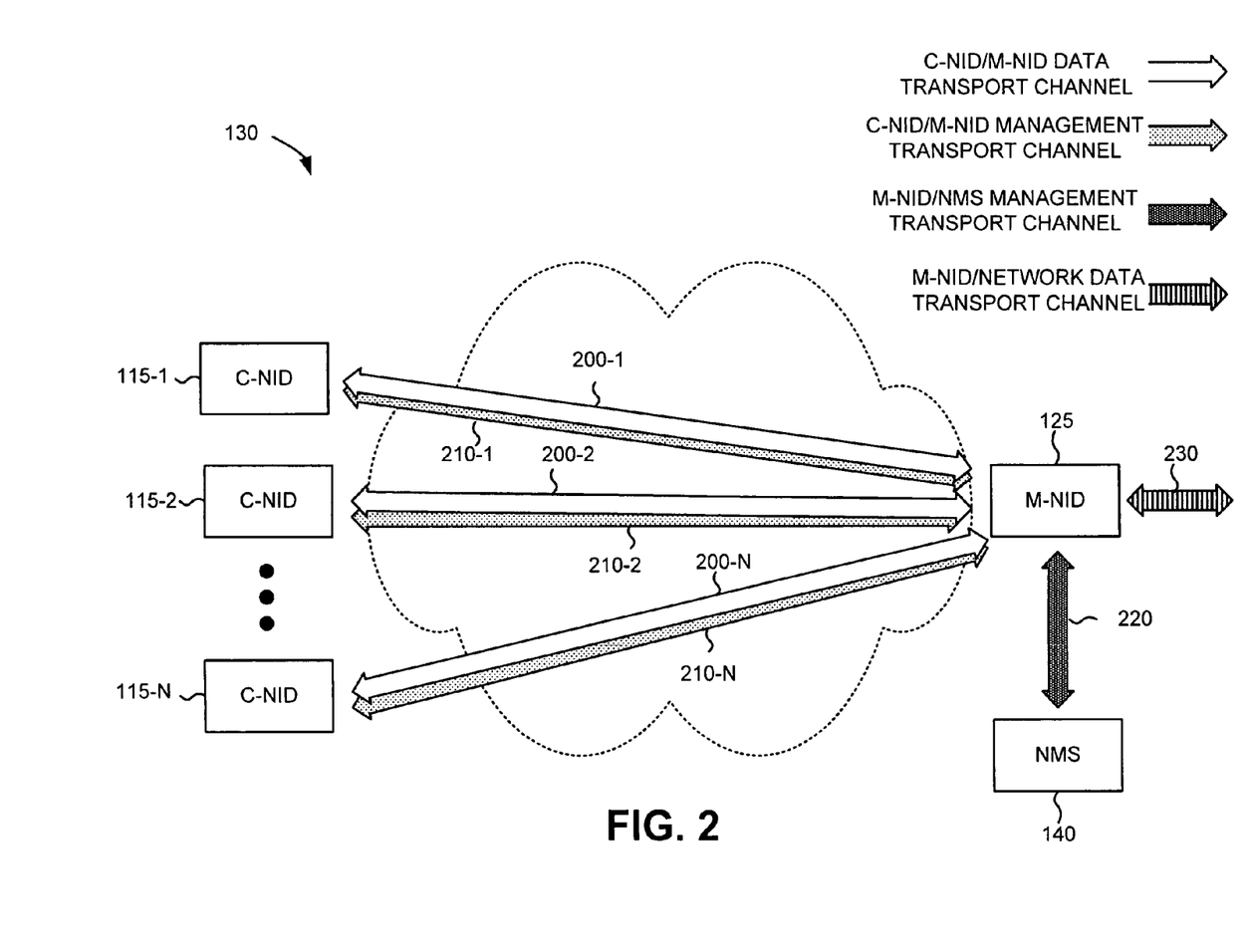
FIG. 2 is an exemplary diagram of data and management traffic transport between client network interface devices and a master network interface device in the network of FIG. 1.

FIG. 2 depicts further details of the transmission of data traffic and management traffic between C-NIDs 115-1 through 115-N and M-NID 125 via network 130, and the transmission of management traffic between M-NID 125 and NMS 140. As shown in FIG. 2, each C-NID 115 may send data traffic to M-NID 125 via a respective C-NID/M-NID data transport channel 200. Each C-NID 115 may further send management traffic to M-NID 125 for delivery to NMS 140 via a respective C-NID/M-NID management transport channel 210. Upon receipt of management traffic from C-NIDs 115-1 through 115-N via the respective C-NID/M-NID management transport channels, M-NID 125 may forward the management traffic on to NMS 140 via M-NID/NMS management transport channel 220. In one exemplary implementation, channels 210-1 through 210-N and 220 may include P2P transport channels that may further include emulated pseudowires (PWs) and/or a form of virtual local area networks (VLANs). M-NID/NMS management transport channel 220 may include a different transport channel than C-NID/M-NID management transport channels 210-1 through 210-N. For example, channel 220 may include VLAN_A and channels 210-1 through 210-N may include VLANs that are different than VLAN_A. Additionally, upon receipt of data traffic from C-NIDs 115-1 through 115-N via respective C-NID/M-NID data transport channels 200-1 through 200-N, M-NID 125 may forward the data traffic via one or more outgoing M-NID/network data transport channel(s) 230 towards a respective destination in network 110. M-NID/network data transport channel(s) may include any type of P2P channel.

Figure 3:
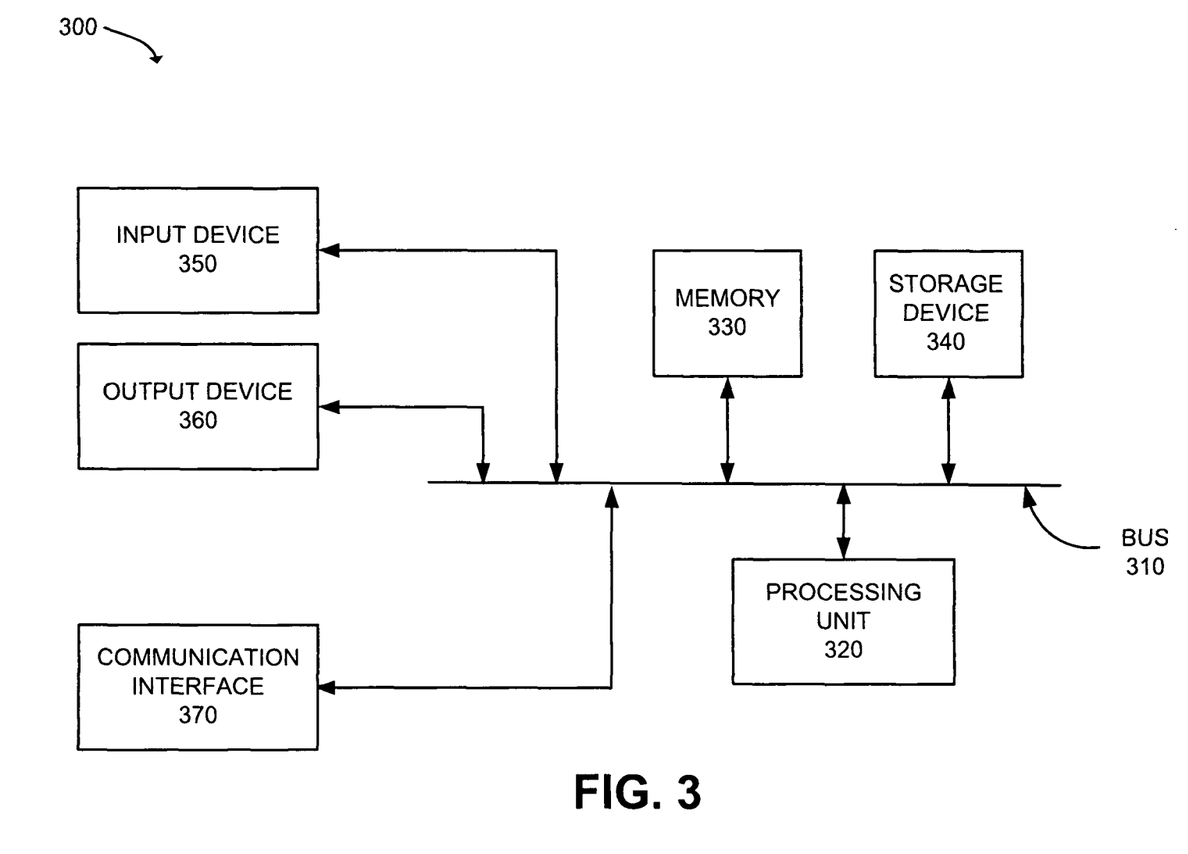
FIG. 3 is a diagram of an exemplary configuration of the network interface devices and/or network management system of FIG. 1.

FIG. 3 is a diagram of a device 300, according to an exemplary implementation, that may correspond to NMS 140, M-NID 125 and/or C-NID 115. Device 300 may include a bus 310, a processing unit 320, a memory 330, a storage device 340, an input device 350, an output device 360, and a communication interface 370. Bus 310 may include a path that permits communication among the elements of device 300.

Processing unit 320 may include, for example, a conventional processor, a microprocessor, or processing logic that may interpret and execute instructions. Memory 330 may include a random access memory (RAM) or another type of dynamic storage device that may store information and instructions for execution by processing unit 320. Memory 330 may further include a ROM device or another type of static storage device that may store static information and instructions for use by processing unit 320. Storage device 340 may include a magnetic and/or optical recording medium and its corresponding drive.

Input device 350 may include a mechanism that permits an operator or another device to input information into device 300, such as a keyboard, a mouse, a pen, voice recognition, a port, and/or biometric mechanisms, etc. Output device 360 may include a mechanism that outputs information to the operator or another device, including a display, a printer, a speaker, a port, etc. Communication interface 370 may include any transceiver-like mechanism that enables device 300 to communicate with other devices and/or systems. For example, communication interface 370 may include mechanisms for communicating with another device or system via a network, such as network 110 or network 130.

Device 300 may perform certain operations or processes described herein. Device 300 may perform these operations in response to processing unit 320 executing software instructions contained in a computer-readable medium, such as memory 330. A computer-readable medium may be defined as a physical or logical storing device. Each of memory 330 and storage device 340 may include computer-readable mediums.

The software instructions may be read into memory 330 from another computer-readable medium, such as storage device 340, or from another device via communication interface 370. The software instructions contained in memory 330 may cause processing unit 320 to perform operations or processes that will be described later. Alternatively, hardwired circuitry may be used in place of or in combination with software instructions to implement processes described herein. Thus, implementations consistent with the principles of the invention are not limited to any specific combination of hardware circuitry and software.

Figure 4:
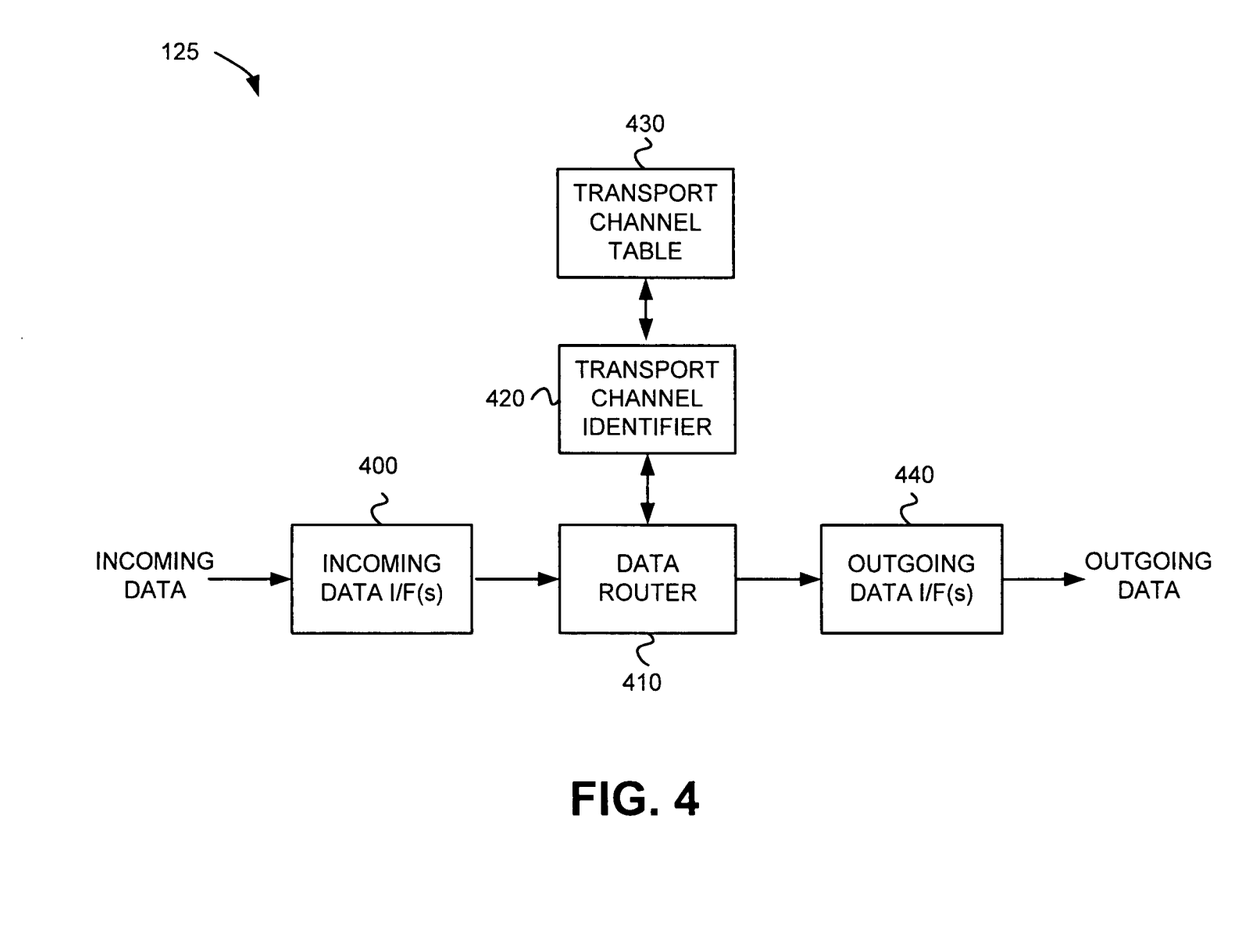
FIG. 4 is an exemplary functional diagram of the master network interface device of FIG. 1.

FIG. 4 illustrates functional components of M-NID 125 according to an exemplary implementation. In one implementation, the functional components depicted in FIG. 4 may be implemented by processing unit 320 and memory 330 of FIG. 3. M-NID 125 may include an incoming data interface(s) (I/F) 400, a data router 410, a transport channel identifier 420, a transport channel table 430, and an outgoing data I/F(s) 440.

Incoming data I/F(s) 400 may receive incoming data, may identify the data's destination (e.g., NMS 140 or one of C-NIDs 115-1 through 115-N) and may pass the data's destination on to transport channel identifier 420.

Data router 410 may route incoming data to an appropriate outgoing transport channel identified by transport channel identifier 420. Transport channel identifier 420 may identify an outgoing transport channel based on the data's destination as determined by I/F 400 through the performance of a lookup into transport channel table 430. Transport channel table 430 may store identifications of data transport channels and management transport channels associated with each of C-NIDs 115-1 through 115-N. Transport channel table 430 is described further below with respect to FIG. 5.

Outgoing data I/F(s) 440 may forward the incoming data to its appropriate destination via the transport channel identified by transport channel identifier 420.

Figure 5:
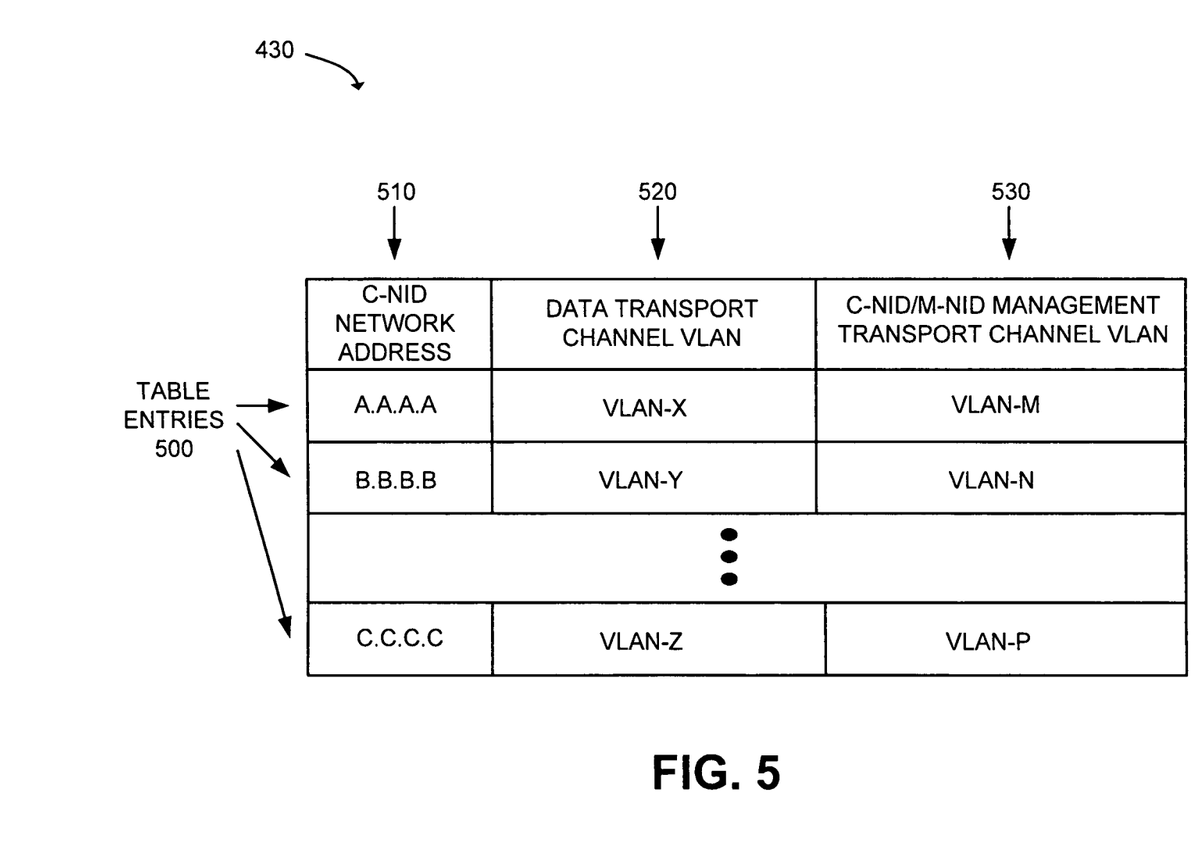
FIG. 5 is a diagram of an exemplary transport channel table stored in association with the master network interface device of FIG. 1.

FIG. 5 depicts exemplary details of transport channel table 430 of FIG. 4. Table 430 may include multiple table entries 500, each of which may include a C-NID network address 510, a data transport channel 520 and a C-NID/M-NID management transport channel 530.

C-NID network address 510 may identify the network address (e.g., an Internet Protocol (IP) address, a Media Access Control (MAC) address) of a C-NID to which data traffic and/or management traffic is destined. Data transport channel 520 may identify a P2P data transport channel to be used for the C-NID identified by the corresponding C-NID network address 510. C-NID/M-NID management transport channel 530 may identify a management transport channel 530 to be used for the C-NID identified by the corresponding C-NID network address 510.

Figure 6A:
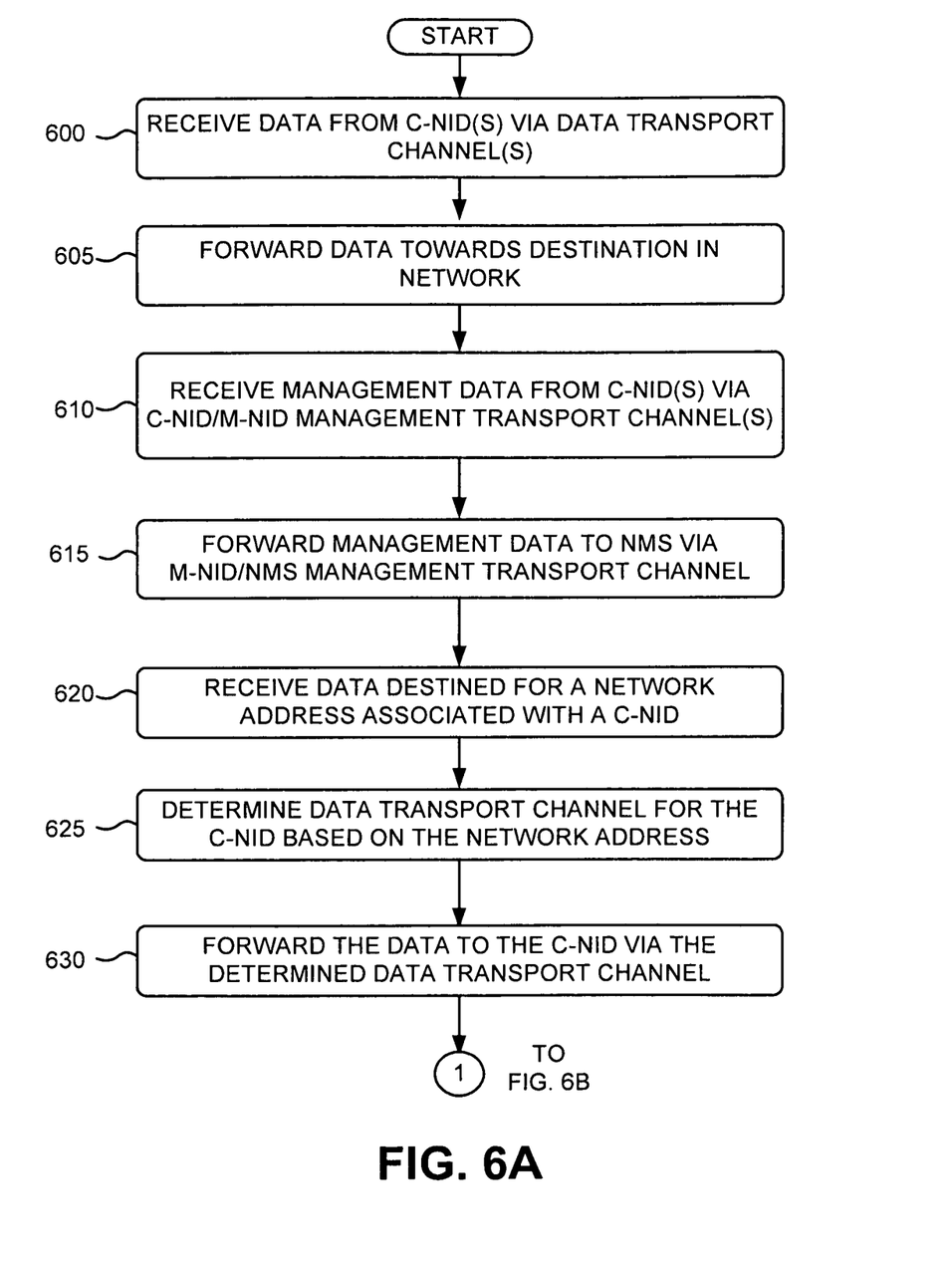
FIGS. 6A and 6B are flow diagrams that illustrate an exemplary process for forwarding data and management traffic to and from C-NIDs configured in a master and client relationship with a master network interface device.
Figure 6B:
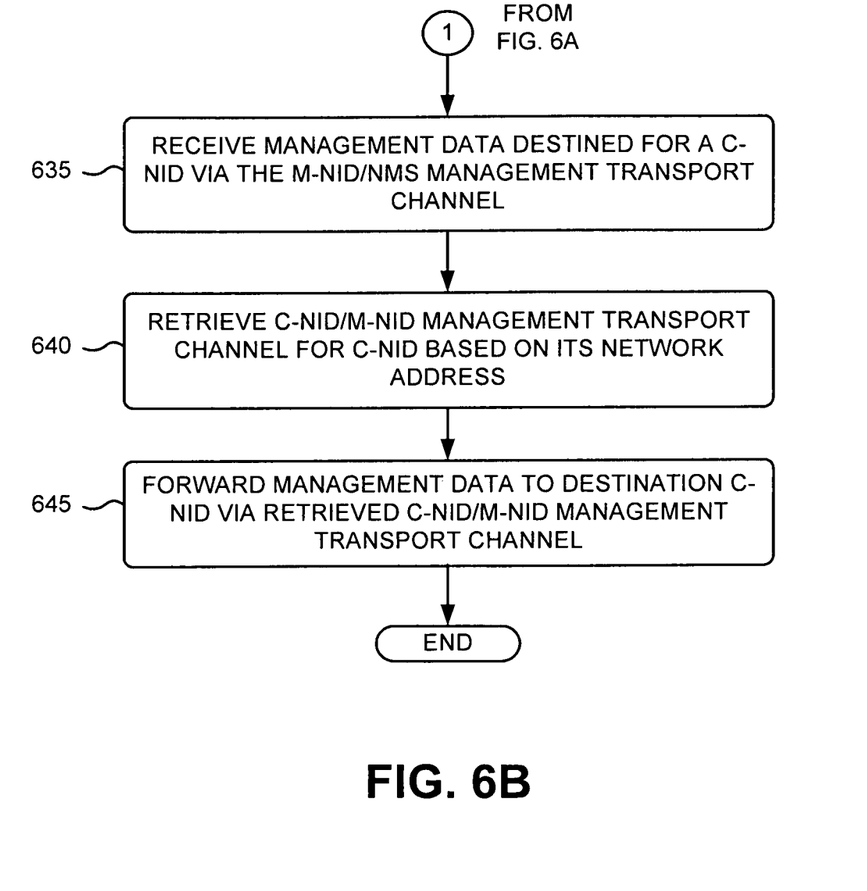

FIGS. 6A and 6B are flow diagrams that illustrate an exemplary process for forwarding data and management traffic to and from C-NIDs configured in a master and client relationship with M-NID 125. The exemplary process of FIGS. 6A and 6B may be implemented by the M-NID 125.

The exemplary process may begin with the receipt of data from one or more C-NIDs via a data transport channel(s) (block 600). Referring to FIG. 2, one or more of C-NIDs 115-1 through 115-N may send data intended for a destination in network 110 (not shown) via respective C-NID/M-NID data transport channels 200-1 through 200-N. In one exemplary implementation, each of data transport channels 200-1 through 200-N may correspond to a different VLAN. Thus, data sent from C-NID 115-1 may be sent via a VLAN that is different than data sent from C-NID 115-2.

The received data may be forwarded towards the destination in network 110 (block 605). M-NID 125 may receive the data from respective ones of C-NIDs 115-1 through 115-N and may forward the data towards their respective destinations in network 110. For example, as shown in FIG. 2, M-NID 125 may forward the data towards respective destinations using M-NID/network transport channel(s) 230.

Management data from a C-NID(s) may be received via a C-NID/M-NID management transport channel(s) (block 610). Referring to FIG. 2, M-NID 125 may receive NID management data via respective C-NID/M-NID management transport channels 210-1 through 210-N. In one exemplary implementation, each of management transport channels 210-1 through 210-N may correspond to a different VLAN.

The received management data may be forwarded to the NMS via a M-NID/NMS management transport channel (block 615). Referring to FIG. 2, M-NID 125 may forward management data received via transport channels 210-1 through 210-N to NMS 140 via M-NID/NMS management transport channel 220. In one exemplary implementation, management transport channel 220 may correspond to a VLAN that is different than the VLANs used to send data traffic or management traffic to M-NID from C-NIDs 115-1 through 115-N.

Data destined for a network address associated with a C-NID may be received (block 620). M-NID 125 may receive data traffic, from one or more sources in network 110 (not shown), that is destined for a C-NID 115. A data transport channel for the C-NID may be determined based on the network address (block 625). M-NID 125 may use the network address of the C-NID to which data traffic is destined to retrieve a data transport channel identifier 520 from an entry 500 of table 430. For example, referring to FIG. 5, if the network address associated with a destination C-NID includes the IP address B.B.B.B, then the transport channel identifier 520 "VLAN-Y" may retrieved from the corresponding entry 500.

The received data may be forwarded to the C-NID via the determined data transport channel (block 630). M-NID 125 may forward the data traffic to the destination C-NID 115 via the determined data transport channel. Referring to FIG. 2, M-NID 125 may forward the data traffic to C-NID 115-1 via data transport channel 200-1.

Management data destined for a C-NID may be received via the M-NID/NMS management transport channel (block 635). M-NID 125 may receive NID management traffic from NMS 140 destined for a C-NID 115. A C-NID/M-NID management transport channel may be retrieved for the C-NID based on the C-NID's network address (block 640). For example, referring to FIG. 5, if the destination C-NID's network address is C.C.C.C, then transport channel "VLAN-P" 530 may be retrieved from the corresponding table entry 500. The received management data may be forwarded to the destination C-NID via the retrieved C-NID/M-NID management transport channel (block 645). Referring to FIG. 2, if C-NID 115-2 is the destination C-NID 115, then M-NID 125 may forward the NID management data to C-NID 115-2 via management transport channel 210-2.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 6A and 6B, the order of the blocks may be modified in other embodiments. Further, non-dependent blocks may be performed in parallel. Additionally, while implementations have been described herein with respect to C-NID and M-NID devices, an Ethernet network and VLAN connections, in other implementations, techniques described herein may be applied to any type of end devices using any type of P2P transport channel.

It will be apparent that aspects described herein may be implemented in many different forms of software, firmware, and hardware in the implementations illustrated in the figures. The actual software code or specialized control hardware used to implement embodiments is not limiting of the invention. Thus, the operation and behavior of these aspects were described without reference to the specific software code, it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, at a master network interface device (M-NID) and from at least one of a first client network interface device (C-NID) or a second C-NID, first data;
   forwarding, by the M-NID, the first data to one or more destinations;
   receiving, at the M-NID and from at least one of the first C-NID or the second C-NID, second data;
   forwarding, by the M-NID, the second data to a network management system (NMS), where the NMS is different than the one or more destinations;
   receiving, at the M-NID and from the NMS, via a first peer-to-peer (P2P) transport channel, third data destined for the first C-NID, where the third data is associated with network management functions and is received in response to the forwarded second data;
   receiving, at the M-NID and from the NMS, via the first P2P transport channel, fourth data destined for the second C-NID, where the fourth data is associated with network management functions and is received in response to the forwarded second data;

forwarding the third data from the M-NID to the first C-NID via a second P2P transport channel that is different than the first P2P transport channel; and forwarding the fourth data from the M-NID to the second C-NID via a third P2P transport channel that is different than the first P2P transport channel.

2. The method of claim 1, where forwarding the third data further comprises:
determining a network address associated with the first C-NID; and
determining the second P2P transport channel based on the determined network address associated with the first C-NID.

3. The method of claim 1, where forwarding the fourth data further comprises:
determining a network address associated with the second C-NID; and
determining the third P2P transport channel based on the determined network address associated with the second C-NID.

4. The method of claim 1, where the first P2P transport channel comprises an emulated pseudowire.

5. The method of claim 1, where the second P2P transport channel is a virtual local area network (VLAN).

6. The method of claim 1, where the first P2P transport channel is a first virtual local area network (VLAN), where the second P2P transport channel is a second VLAN, and where the third P2P transport channel is a third VLAN that is different than the first and second VLANs.

7. The method of claim 1, where the second data is received from the first C-NID and is associated with network management functions, the method further comprising:
forwarding the second data from the M-NID to the NMS via the first P2P transport channel.

8. The method of claim 7, further comprising:
receiving, at the M-NID and from the second C-NID, other data destined for the NMS, where the other data is associated with network management functions; and
forwarding the other data from the M-NID to the NMS via the first P2P transport channel.

9. The method of claim 1, further comprising:
receiving, at the M-NID and from a third C-NID, fifth data;
forwarding, by the M-NID, the fifth data to the NMS;
receiving, at the M-NID and from the NMS via the first P2P transport channel, sixth data destined for the third C-NID; and
forwarding the sixth data from the M-NID to the third C-NID via a fourth P2P transport channel.

10. A master network interface device (M-NID), comprising:
an interface to:
receive, from at least one of a first client network interface device (C-NID) or a second C-NID, first information;
forward the first information to one or more destinations;
receive, from at least one of the first C-NID or the second C-NID, second information;
forward the second information to a network management system (NMS), where the NMS is different than the one or more destinations;
receive, from the NMS, first data destined for the first C-NID via a first peer to peer (P2P) transport channel, where the first data is associated with network management functions and is received in response to the forwarded second information; and
receive, from the NMS, second data destined for the second C-NID via the first P2P transport channel, where the second data is associated with network management functions and is received in response to the forwarded second information; and
a data router to:
forward the first data from the M-NID to the first C-NID via a second P2P transport channel that is different than the first P2P transport channel; and
forward the second data from the M-NID to the second C-NID via a third P2P transport channel that is different than the first P2P transport channel.

11. The master network interface device of claim 10, where the first P2P transport channel is an emulated pseudowire or a virtual local area network (VLAN).

12. The master network interface device of claim 10, where the first P2P transport channel is a first virtual local area network (VLAN), where the second P2P transport channel is a second VLAN, and where the third P2P transport channel is a third VLAN that is different than the first and second VLANs.

13. The master network interface device of claim 10, where the second information is received from the first C-NID and is associated with network management functions, and
where the data router is further to:
forward the second information from the M-NID to the NMS via the first P2P transport channel.

14. The master network device of claim 13, where the interface is further to:
receive, from the second C-NID, other information destined for the NMS, where the other information is associated with network management functions, and
where the data router is further to:
forward the other information from the M-NID to the NMS via the first P2P transport channel.

15. The master network interface device of claim 10, where:
the interface is further to:
receive, from a third C-NID, third information;
forward the third information to the NMS; and
receive, from the NMS via the first P2P transport channel, third data destined for the third C-NID; and
the data router is further to:
forward the third data from the M-NID to the third C-NID via a fourth P2P transport channel.

16. A method, comprising:
receiving, at a master network interface device (M-NID) and from at least one of a first client network interface device (C-NID) or a second C-NID, first data
forwarding, by the M-NID, the first data to one or more destinations;
receiving, at the M-NID and from the first C-NID, via a first peer-to-peer (P2P) transport channel, second data destined for a network management system (NMS), where the first data is associated with network management functions;
receiving, at the M-NID and from the second C-NID, via a second P2P transport channel, third data destined for the NMS, where the second data is associated with network management functions;
forwarding the second data from the M-NID to the NMS via a third P2P transport channel that is different than the first and second P2P transport channels, where the NMS is different than the one or more destinations;
forwarding the third data from the M-NID to the NMS via the third P2P transport channel; and receiving, at the M-NID and from the NMS, fourth data destined for at least one of the first C-NID or the second C-NID, where the fourth data is received in response to at least one of the forwarded second data or the forwarded third data.

17. The method of claim 16, where the first, second and third P2P transport channels are different emulated pseudowires or different virtual local area networks (VLANs).

18. The method of claim 16, where the first P2P transport channel is a first virtual local area network (VLAN), where the second P2P transport channel is a second VLAN, and where the third P2P transport channel is a third VLAN, where the second and third VLANs are different than the first VLAN.

19. The method of claim 16, further comprising:
forwarding the fourth data data from the M-NID to at least one of the first C-NID or the second C-NID.

20. The method of claim 16, further comprising:
receiving, at the M-NID and from a third C-NID via a fourth P2P transport channel, fifth data;
forwarding the fifth data from the M-NID to the NMS via the third P2P transport channel;
receiving, at the M-NID and from the NMS via the third P2P transport channel, sixth data destined for the third C-NID; and
forwarding the sixth data from the M-NID to the third C-NID.

\* \* \* \* \*